UNITED STATES PATENT OFFICE.

CHARLES DE LA HARPE, OF BASLE, SWITZERLAND, ASSIGNOR TO L. DURAND, HUGUENIN & CO., OF SAME PLACE, ST. FOUS, FRANCE, AND HÜNINGEN, GERMANY.

BLUE DYE FROM GALLOCYANIN AND PROCESS OF MAKING SAME.

SPECIFICATION forming part of Letters Patent No. 616,622, dated December 27, 1898.

Application filed February 5, 1898. Serial No. 669,225. (Specimens.)

*To all whom it may concern:*

Be it known that I, CHARLES DE LA HARPE, a citizen of the Swiss Republic, and a resident of Basle, Switzerland, have invented certain improvements in the manufacture of leuco compounds suitable for dyeing purposes and for printing of textures, of which the following is a full, clear, and exact specification.

I have discovered that the leuco compound which is produced by the condensation of resorcinol with a gallocyanin dye—as, for instance, the gallocyanin dye resulting from the condensation of gallamic acid with the hydrochlorate of diethylamidoazo-benzene or the hydrochlorate of nitrosodiethylanilin, and which is described in Letters Patent No. 547,173, dated October 1, 1895—can, by boiling it with an aqueous solution of an alkali out of contact with the air, be converted into a body which is more readily soluble in water and more easily oxidized on the fiber than the original leuco compound and gives in printing redder-blue tints than the latter.

The production of this new body will be clearly understood by the following example:

Example: One part of the leuco compound obtained, according to Example II of Letters Patent No. 547,173, by the combination of resorcinol with the gallocyanin dye, resulting from the condensation of gallamic acid with the hydrochlorate of diethylamidoazo-benzene or the hydrochlorate of nitroso-diethylanilin and five to six parts of water, are introduced into a suitable vessel provided with any convenient stirring appliance and the contents of which may be secured in any way from the contact of the air, and the mixture is boiled for some time in order to drive out the air contained in the vessel. An aqueous solution of caustic soda or sodium carbonate containing, for example, about one part of alkali is then added to the mixture while stirred, and the mass is further boiled for some time, care being taken to avoid the access of air to the mass. The solution is then poured into cold salt water containing the necessary quantity of hydrochloric or sulfuric acid for the saturation of the alkali employed, whereby the new body is precipitated in a more or less resinous state. After filtration the precipitate is dissolved in pure water and the solution obtained can then be employed directly for printing purposes, or the leuco body may be precipitated from this solution by an addition of common salt filtered and dried.

When printed on calico with metallic mordants, and especially those of chromium, and oxidized on the fiber, the new leuco body is transformed into a reddish-blue coloring-matter.

In the preparation of this leuco body the quantities of water and of alkali employed and the duration of boiling the mixture may be varied.

Having thus described my invention, I claim—

1. The herein-described process for the production of a leuco body, suitable for dyeing purposes and for printing on textile fabrics, derived from the product of condensation of resorcinol with a gallocyanin dye, the said process consisting in boiling the said product of condensation with an aqueous solution of an alkali while out of contact with the air.

2. As a new article of manufacture, the herein-described leuco body, suitable for dyeing purposes and for printing on textile fabrics, and produced by boiling the product of condensation of resorcinol with a gallocyanin dye, the said leuco body, which, in a dry state, is a greenish-black powder, soluble in water, coloring fibers, when applied and oxidized thereon, in redder-blue tints and being more readily soluble in water and more easily oxidized on the fiber than the said product of condensation.

In witness whereof I have hereunto signed my name, this 24th day of January, 1898, in the presence of two subscribing witnesses.

CHARLES DE LA HARPE.

Witnesses:
GEORGE GIFFORD,
AMAND RITTER.